United States Patent [19]

Andrew et al.

[11] Patent Number: 5,095,687
[45] Date of Patent: Mar. 17, 1992

[54] ADJUSTABLE SUPPORT WHEEL ASSSEMBLY FOR ROTATING FLEXIBLE LINE-TYPE VEGETATION TRIMMER

[75] Inventors: Robert G. Andrew; Gary J. Grandstaff, both of Bridgeport; Ira L. Morris, Glenville, all of W. Va.

[73] Assignee: The Big Company, Inc., Glenville, W. Va.

[21] Appl. No.: 696,017

[22] Filed: May 6, 1991

[51] Int. Cl.⁵ .................... A01D 34/74; A01D 34/84
[52] U.S. Cl. .................... 56/12.7; 30/275.4; 30/296.1; 56/17.2; 172/17
[58] Field of Search .................... 56/16.7, 12.7, 17.2, 56/17.4, 17.5, 322, 473.5, DIG. 18; 172/13, 17, DIG. 5; 30/272.1, 275.4, 276, 296.1

[56] References Cited

U.S. PATENT DOCUMENTS

| | | | |
|---|---|---|---|
| 2,032,467 | 3/1936 | Burke | 172/17 X |
| 3,977,078 | 9/1976 | Pittinger, Jr. | 30/276 |
| 4,224,784 | 9/1980 | Hansen et al. | 56/16.9 |
| 4,364,435 | 12/1982 | Tuggle et al. | 172/15 |
| 4,829,755 | 5/1989 | Nance | 56/17.1 |
| 4,891,931 | 1/1990 | Holland | 56/16.7 |
| 4,914,899 | 4/1990 | Carmine | 56/16.7 |
| 4,922,694 | 5/1990 | Emoto | 56/16.7 |
| 4,981,012 | 1/1991 | Claborn | 56/16.9 |

FOREIGN PATENT DOCUMENTS 1551622  8/1979  United Kingdom ................ 56/12.7

Primary Examiner—David J. Bagnell
Attorney, Agent, or Firm—Cushman, Darby & Cushman

[57] ABSTRACT

A conventional rotating flexible line-type vegetation trimmer having a shield covering from above a length of line whipping from one end in a generally horizontal plane about a generally vertical axis, is provided with a swivelable ground-engaging wheel, supported out-of-the-way-of the rotating line, by adjustable swivel brackets respectively mounted by a clip and a clamp to a down-turned flange on the shield and an intermediate location on the handle shaft of the trimmer, and to a shaft on the lower end of which the wheel is swivelably mounted.

6 Claims, 4 Drawing Sheets

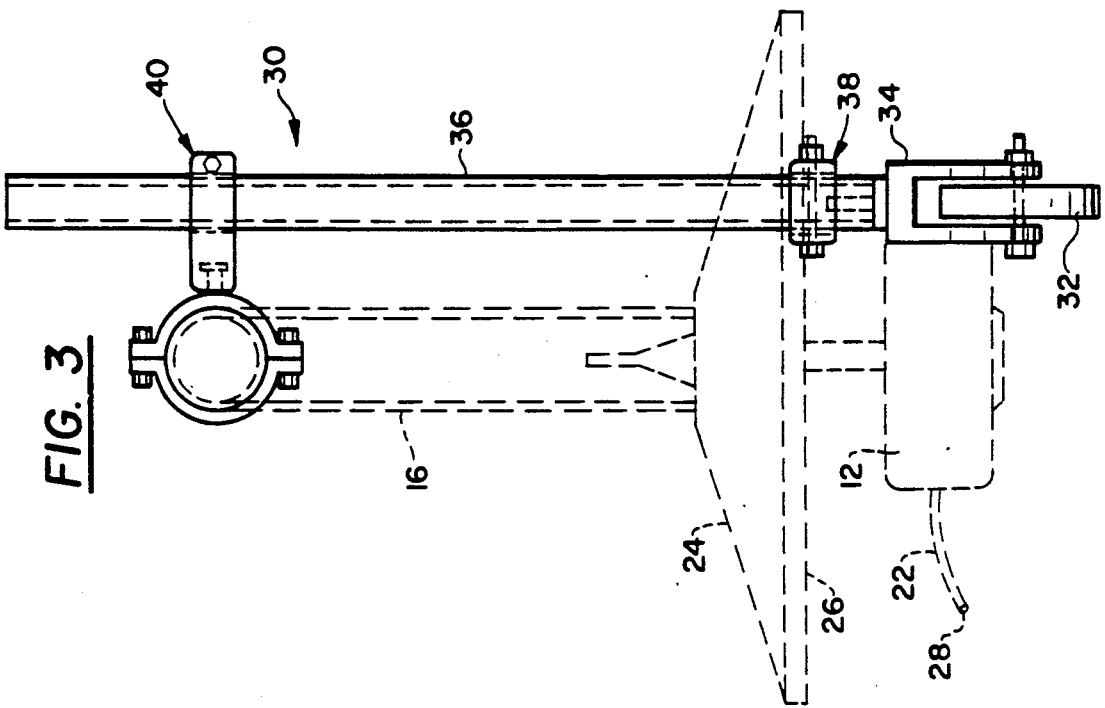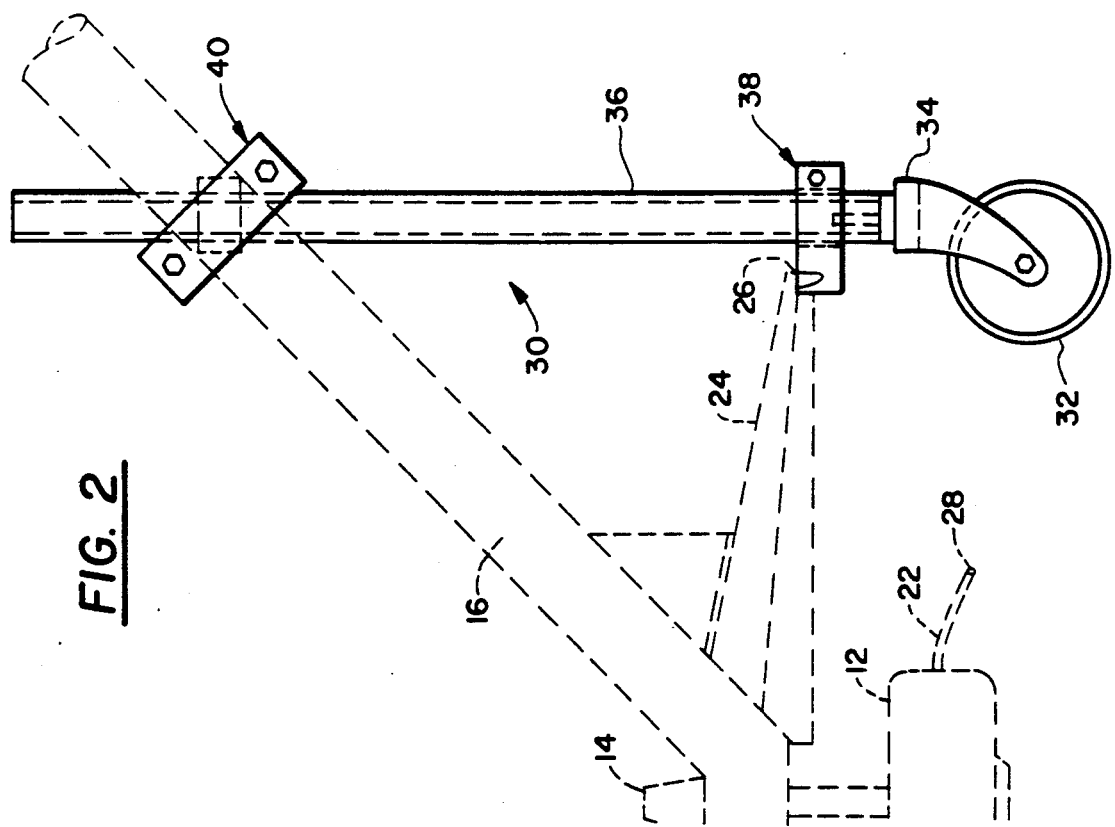

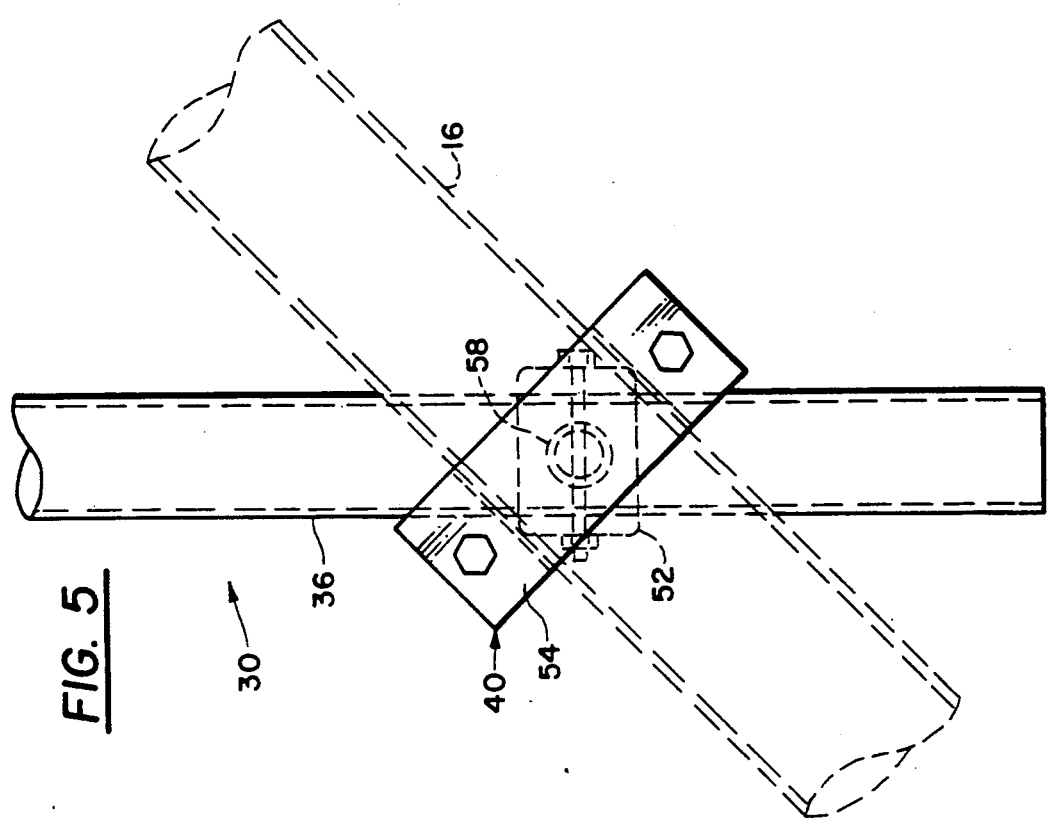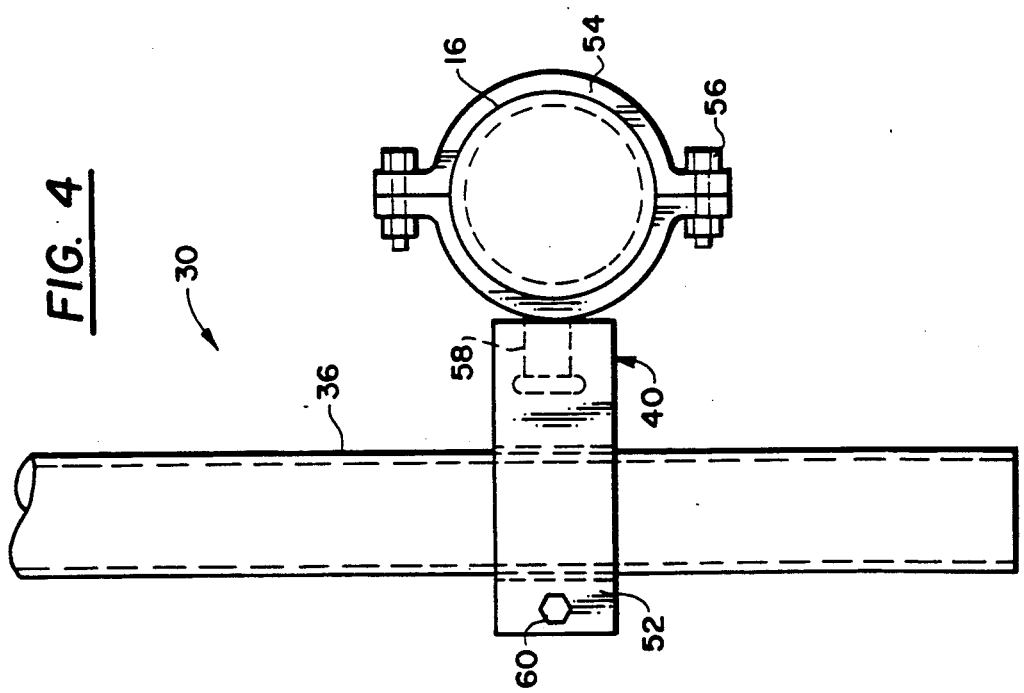

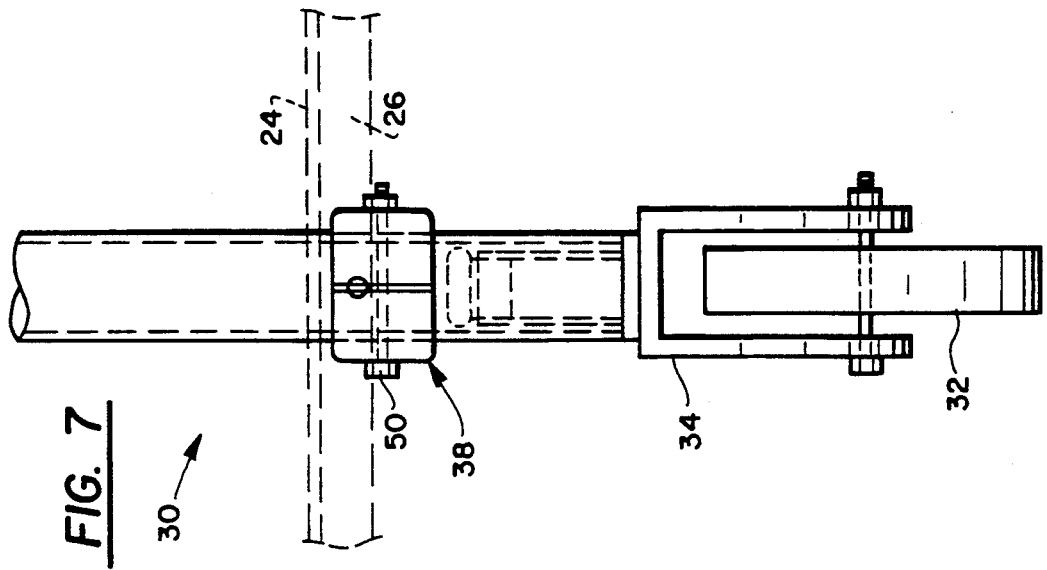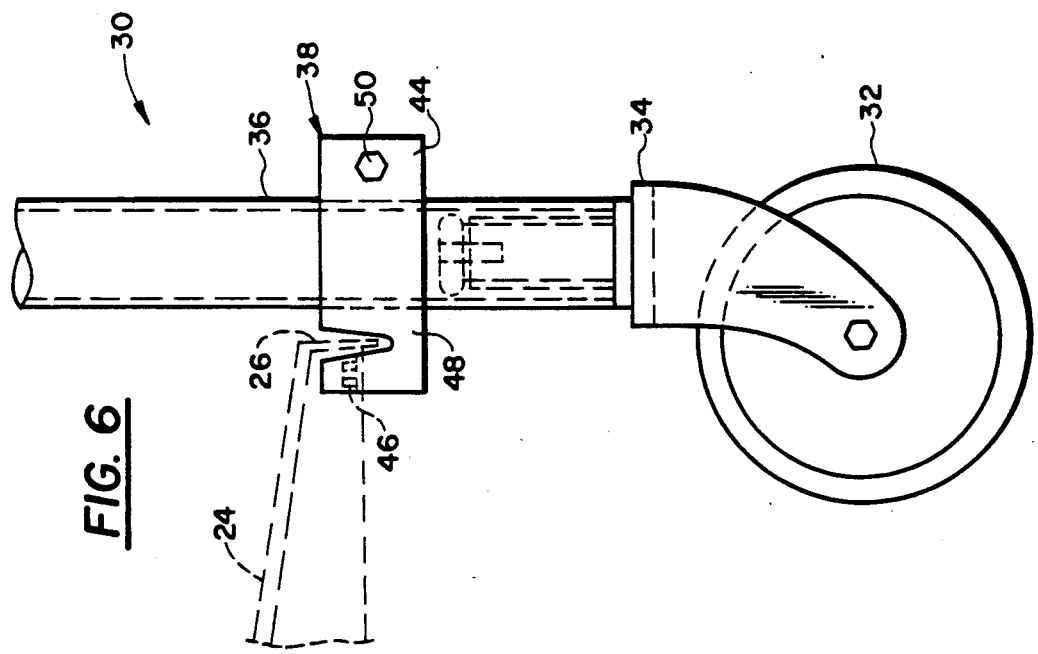

ADJUSTABLE SUPPORT WHEEL ASSSEMBLY FOR ROTATING FLEXIBLE LINE-TYPE VEGETATION TRIMMER

BACKGROUND OF THE INVENTION

Within the last 10-20 years, hand-held power-operated vegetation trimmers having a whirling string or monofilament line, have become very popular as devices for cutting weeds, edging lawns, mowing in areas inaccessible to mowers, and for similar tasks. Although many companies market such devices under many trademarks, probably the best known are the ones sold under the trademark "Weedeater". It is understood that, generically, such devices are referred to as "string trimmers" or "line trimmers", regardless of the fact that they are not a kind of device used for trimming a string or line, but a kind of device which uses a string or line to trim something else, namely vegetation. Thus, the terms "string trimmer", "line trimmer" and "rotating flexible line-type vegetation trimmer" are used synonymously herein.

There are some differences among the conventional trimmers; some are electric motor-powered, other are gasoline engine-powered, it is conceivable some are hydraulic or pneumatic motor powered. Some have straight handle shafts, others have curved handle shafts. The present invention is meant to be used with any of these regardless of which type of motor they have, and regardless of whether they have straight or curved handle shafts.

Most conventional trimmers are meant to be used while the line is whipping around in a generally horizontal plane about a generally vertical axis. Other orientations are possible, but, when used in other orientations (e.g., with the line whipping around in a vertical plane), the shield normally provided on the device for preventing bits of vegetation, line, dirt and gravel from flying up into user's and bystander's face. Despite manufacturer's instructions to the contrary, some people use the devices on edge anyway, and, in fact, some prior inventors have devised wheeled supports for supporting line trimmers in an on-edge orientation.

In general, conventional line trimmers are designed in the form of a downwardly facing rotary head, covered by a radially projecting arcuate shield having a down-turned flange at its radially outer end, the head and shield being mounted to the lower end of a substantially rigid, generally tubular shaft having one handle at its upper end, and often another, radially projecting handle adjustably located at an intermediate height.

For trimming jobs of short duration performed by a reasonably athletic youngster, the typical conventional trimmer works very well, but the longer the job, the more "out-of-shape", tired, elderly or not-so-strong the user, the more likely that person will leave the job undone, partly done, or be achy from muscle strain after use of such a conventional device. The main problem is that they have to cantilever so much weight so far from their body, and swing it around in arcs and back and forth, basically without any support of the head from the ground. (In fact, bumping the hub at the bottom-center of the head against the ground is used in some designs of trimmers as a means for initiating a feed-out of an increment of the line coiled on a spool in the head.)

A main purpose of the device of the present invention is to provide a wheeled support for a conventional line trimmer, which can be mounted to conventional line trimmers of widely varying designs, yet allow them to be used in the manufacturer's intended orientation (in which the line whirls from one end in a generally horizontal plane about a generally vertical axis, while protected by a covering shield).

SUMMARY OF THE INVENTION

A conventional rotating flexible line-type vegetation trimmer having a shield covering from above a length of line whipping from one end in a generally horizontal plane about a generally vertical axis, is provided with a swivelable ground-engaging wheel, supported out-of-the-way-of the rotating line, by adjustable swivel brackets respectively mounted by a clip and a clamp to a down-turned flange on the shield and an intermediate location on the handle shaft of the trimmer, and to a shaft on the lower end of which the wheel is swivelably mounted.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the Drawings

FIG. 2 is a large-scale fragmentary side elevation view of the structure shown in FIG. 1;

FIG. 3 is a rear elevation view of the device, showing the preferred swivelable wheel and way for mounting the swivelable wheel on the lower end of the height adjustment shaft;

FIG. 4 is a fragmentary perspective view from one direction of a combined tubular mounting bracket and first swivel bracket, for mounting the assembly to the handle shaft of the line trimmer (all of the remainder of the assembly and all of the remainder of the line trimmer being omitted from this figure);

FIG. 5 is a fragmentary side elevation view showing how the structure shown in FIG. 4 mounts an upper portion of the height adjustment shaft of the assembly, to an intermediate portion of the handle shaft of the conventional line trimmer (the two shafts being shown only fragmentarily in this figure);

FIG. 6 is a fragmentary side elevation view of a combined mounting clip and second swivel bracket, for mounting the assembly to the down-turned flange of the shield of the line trimmer (all of the remainder of the assembly and all of the remainder of the line trimmer being omitted from this figure); and FIG. 7 is a fragmentary rear elevation view showing how the structure shown in FIG. 6 mounts a lower portion of the height adjustment shaft of the assembly, to the down-turned flange of the shield of the conventional line trimmer (the height adjustment shaft and shield being shown only fragmentarily in this figure).

DETAILED DESCRIPTION

Figure 1:
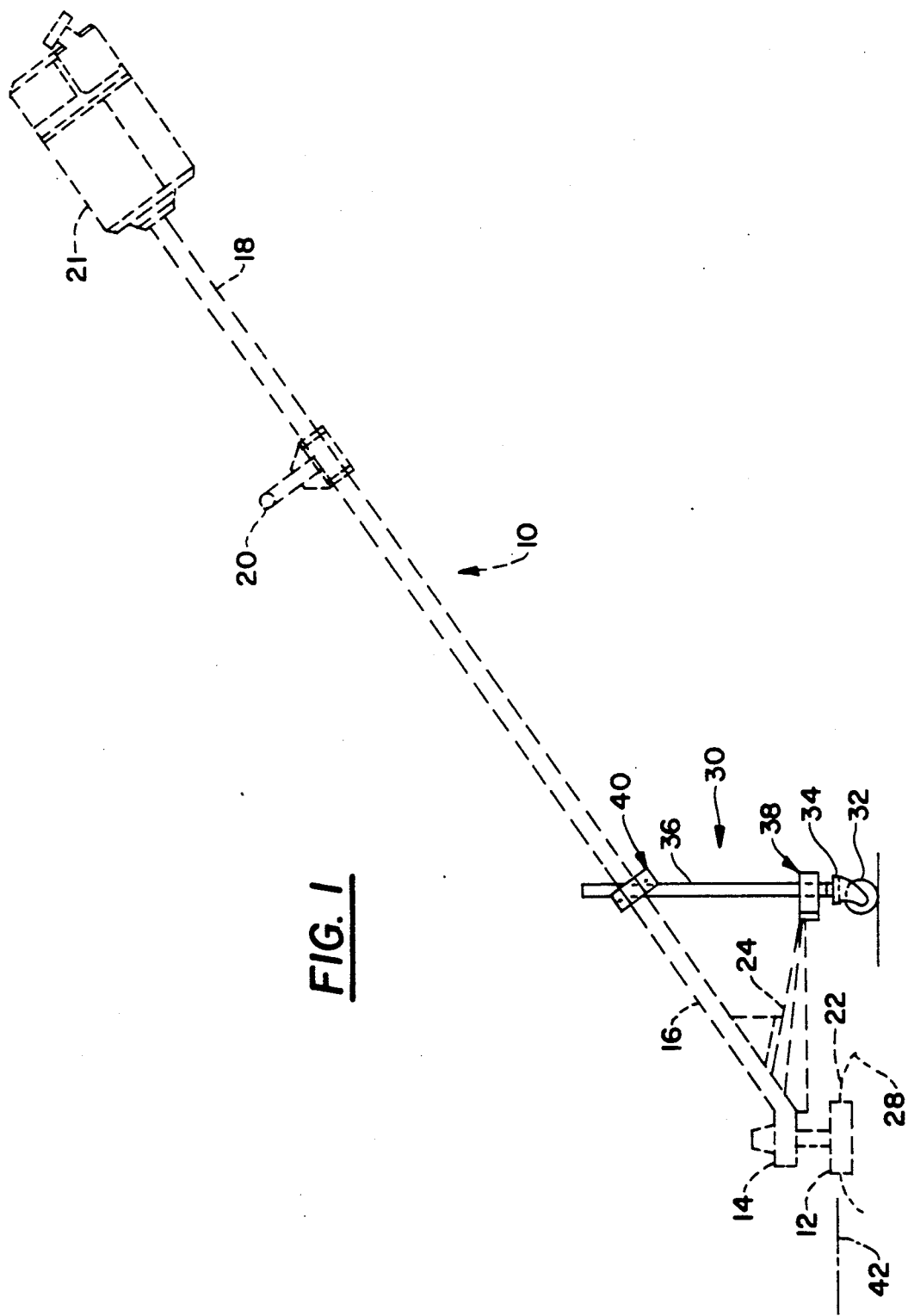
FIG. 1 is a side elevation view of a conventional line trimmer (shown in dashed lines) having mounted thereto an adjustable support wheel assembly embodying principles of the present invention.

A conventional rotating flexible line-type vegetation trimmer is shown at 10 in FIG. 1 (and fragmentarily in FIGS. 2-7). In the conventional device, a downwardly facing rotary head 12 is journalled in a housing 14 that is mounted on the lower end of a handle shaft 16 that has a handle 18 at its upper end. In use, the user grasps the handle 18 with one hand and an intermediate location on the handle shaft 16 (or an auxiliary handle 20 provided at this location) with his or her other hand. An electric, gasoline or other motor 21 (which may be located in the housing 14, or up at or near the handle 18, or elsewhere on the device) is operatively connected to the rotating head 12 for rotating the head about a generally vertical axis. The head 12 is provided with a supply of trimming line (e.g., flexible monofilament synthetic plastic resin line) e.g., wound on a spool (not shown), so as to have a leading end portion extending radially outwards from a hub of the head 12, so that this working segment of the line has a radially inner end next to the hub, and a free radially outer end. In use, as the head 12 rotates, the working segment 2 of the line whips around the axis of the hub in a generally horizontal plane perpendicular to the axis of rotation of the head 12.

The conventional device 10 further includes a shield 24 which is attached either to the housing 14, or to the handle shaft 16 above the housing 14, so as to extend radially outwards over the plane in which the line segment 22 rotates. The shield 24 may have a circular portion which extends radially outwards about the whole circumference of the handle shaft, but certainly includes an arcuate portion which extends over a corresponding portion of the plane of rotation of the line segment 22. The shield 24 further includes at its radially outer end a down-turned flange 26 (FIGS. 2, 3, 6 and 7) which extends down past the radially outer end 28 of the rotating line segment 22.

Everything about the device 10 as described so far is conventional and typical. The details could vary from one model to another, yet the assembly of the present invention can be used with most, if not all, of them.

Now, referring to FIGS. 1–7, the wheel assembly 30 of the present invention will be described in more detail.

In general, the assembly 30 includes a rotatable, wheel 32 swivelably mounted by a structure 34 to the lower end of a height adjustment shaft 36, and structures 38 and 40 for adjustably connecting the height adjustment shaft 36 respectively at a lower site to the flange 26, and at an upper site to an intermediate location on the handle shaft 16. The devices 38 and 40 are constructed so as to each have two opposite gripping ends which, in the instance of the device 40, are swivelable relative to one another (to accommodate mounting of the assembly to trimmers of varying design), and each having a respective one gripping end that can be loosened to allow the height adjustment shaft 36 to be slid up or down, so as to vary the distance between the bottom of the wheel 32 and the plane 42 in which the line segment 22 rotates (i.e., for regulating the height of the cutting plane relative to the ground over which the wheel 32 rolls as the trimmer 10 having the assembly 30 mounted thereon, is being used).

The assembly is preferably made of the same types of material used for making trimmers and similar consumer-operated power tools, e.g., chrome-plated steel, aluminum and engineering plastics.

The wheel 32 may be conventionally made and supported for rolling on the ground and rotating about a generally vertical axis by the structure 34, which may be constructed and used in much the same way that a structure is conventionally used for mounting a caster wheel to a rear leg of a grocery cart. A preferred structure is illustrated at 34 in FIGS. 1, 2, 3, 6 and 7.

The structure 38 adjustably mounts the height adjustment shaft 36 to the down-turned radially outer end flange 26 on the shield 24 of the trimmer 10. For this purpose, the structure 38 has a first adjustable connector 44 for adjustably clamping the structure 38 to the height adjustment shaft 36 at a first, lower site, a second connector, in the form of a screw clamp 46 which frictionally clips onto a lower edge portion of the flange 26 of the shield 24. Connector body 48 connects the connectors 44 and 46 to one another. The first connector 44 is in the form of a tubing clamp having a tightenable element 50 such as a screw, which, when tightened, fixes the structure 38 on the shaft 36, but which, when loosened, permits the user to rotate (swivel) the structure 38 on the shaft 36, and to slide the shaft 36 up or down to provide a new desired cutting level by changing the distance between the bottom of the wheel 32 and the line rotation plane 42.

The structure 40 adjustably mounts the height adjustment shaft 36 to the handle shaft 16 of the trimmer at an intermediate location between the head 12 and the handle 18. For this purpose, the structure 40 has a first adjustable connector 52 for adjustably clamping the structure 40 to the height adjustment shaft 36 at a second, higher site, a second connector 54, in the form of an adjustable tubing clamp having a tightenable element 56 for adjustably fixing the structure 40 at a selected position on the handle shaft 16, and a rotary joint 58. The rotary joint 58 connects the connectors 52 and 54 to one another, while allowing them to rotate relative to one another (for accommodation to different trimmer designs), about a generally horizontal longitudinal axis that coincides with or is generally parallel to a straight line joining the handle shaft and the height adjustment shaft at the location of the structure 40. The first connector 52 is also in the form of a tubing clamp having a tightenable element 60 such as a screw, which, when tightened, fixes the structure 40 on the shaft 36, but which, when loosened, permits the user to slide the shaft 36 up or down to provide a new desired cutting level by changing the distance between the bottom of the wheel 32 and the line rotation plane.

In practice, for adjusting the cutting height, both first connectors 44 and 52 are loosened, the height adjustment shaft 36 slid up or down, and both first connectors 44 and 52 are retightened to re-fix them to the shaft 36.

The clip 46 may have the form of a clamp having a tightenable connector such as a screw for adjustably fixing the clip 46 to the end flange on the shield 24.

It should now be apparent that the adjustable support wheel assembly for rotating flexible line-type vegetation trimmer as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. An adjustable support wheel assembly for a rotating flexible line-type vegetation trimmer of the type having a length of flexible line which is whipped around by one end in a generally horizontal plane while supported at the lower end of a handle shaft and at least partially covered from above by a shield which projects radially generally outwards from the handle shaft and terminates at a radially outer end in a down-turned flange which has a lower edge disposed below said generally horizontal plane, said assembly comprising:

a longitudinally elongated height adjustment shaft having a longitudinal axis, an upper end and a lower end;

a ground support wheel;

means mounting the ground support wheel on the lower end of the height adjustment shaft for rotation about an axis generally parallel to said longitudinal axis of said height adjustment shaft and for rolling contact with the ground about a generally horizontal axis;

a first structure for adjustably mounting said height adjustment shaft to said down-turned flange at a first, lower site on said height adjustment shaft; and a second structure for adjustably mounting said height adjustment shaft to said handle shaft at a second, upper site on said height adjustment shaft;

said first and second structures having respective first connectors arranged for loosening and tightening relative to said height adjustment shaft, so that, for adjusting a cutting height defined as the vertical distance between where said wheel rollingly engages the ground, and said plane, said first connectors may be loosened, said height adjustment shaft slid along said longitudinal axis thereof, and said first connectors retightened to fix said first connectors on said height adjustment shaft.

2. The adjustable support wheel assembly of claim 1, wherein:

said first structure is arranged to be adjustably mounted to said down-turned flange, by a second connector, and said first structure further includes a connector body connecting said first and second connectors of said first structure to one another; and said second structure is arranged to be adjustably mounted to said handle shaft, by a second connector, and said second structure further includes a joint connecting said first and second connectors of said second structure to one another.

3. The adjustable support wheel assembly of claim 2, wherein:

said joint of said second connector is a swivel joint.

4. The adjustable support wheel assembly of claim 2, wherein:

said second connector of said first structure is a clip arranged to frictionally clip onto said lower edge of said down-turned flange.

5. The adjustable support wheel assembly of claim 2, wherein:

said second connector of said second structure is a tubing clamp.

6. The adjustable support wheel assembly of claim 2, wherein:

said joint of said second connector is a swivel joint;

said second connector of said first structure is a clip arranged to frictionally clip onto said lower edge of said down-turned flange; and said second connector of said second structure is a tubing clamp.

* * * * *